United States Patent Office 3,717,520
Patented Feb. 20, 1973

3,717,520

COMPOSITION AND METHOD FOR SELECTIVELY STRIPPING NICKEL AND/OR COPPER

Frank A. Brindisi, Jr., Madison, Conn., assignor to Enthone, Incorporated, New Haven County, Conn.

No Drawing. Filed Feb. 9, 1971, Ser. No. 114,066
Int. Cl. C23f 1/20
U.S. Cl. 156—18 12 Claims

ABSTRACT OF THE DISCLOSURE

Stripping solutions for selectively dissolving nickel and/or copper from metal and plastic substrates and which are alkaline solutions comprising:

(a) a nitro-substituted aromatic compound having at least one —$NO_2$ group attached to the aromatic ring and a water-solubilizing substituent also attached to the aromatic ring;
(b) elemental sulfur;
(c) an alkali phosphate;
(d) an alkali chloride;
(e) an alkylene polyamine; and
(f) a corrosion attack inhibitor.

BACKGROUND OF THE INVENTION

(1) Field of the invention

This invention relates to stripping nickel and/or copper from substrates, and more particularly to new and improved compositions and method for selectively removing nickel and/or copper from metal and non-metal substrates without substantially any detrimental effect to the substrate surface.

(2) Description of the prior art

One problem encountered in electroplating plants is the rejection of plated articles due to defects, imperfections, poor adhesion or other non-optimum characteristics of the deposited metal plate or film which render the plated articles or parts unusable. When the plated article or part is sufficiently valuable, it is economically desirable to reclaim the basic article or part by stripping part or all of the defective metal plate or coating from the basic article. The reclaimed article or part may then be re-plated.

Alkaline cyanide solutions containing a nitro-substituted aromatic compound are well known in the art for stripping nickel plate from articles. Although these solutions give good results in stripping nickel, they tend to be hazardous to work with due to the very high toxicity of cyanide. Such cyanide solutions are disclosed in U.S. Pat. 2,649,361.

Non-cyanide alkaline solutions for selectively stripping nickel from metal bases including a copper base and containing elemental sulfur, a nitro-substituted organic compound and an alkylene polyamine are disclosed by U.S. Pat. 3,102,808. The objective is to dissolve only the nickel and to leave the copper or to minimize the copper loss. Non-cyanide alkaline stripping solutions for selectively dissolving nickel from a base metal and containing a nitro-substituted organic compound, an ammonium salt which may be ammonium phosphate or ammonium chloride, and a sulfur compound are disclosed by U.S. Pat. 3,245,780. Such stripping solutions are characterized by their capacity of keeping to a minimum corrosion and damage to the basis metal during the stripping. U.S. Pat. 3,203,787 discloses non-cyanide, alkaline stripping solutions for dissolving electroless nickel deposits from copper and copper alloy basis metal without adversely affecting the basis metal. Such solutions comprise a ternary system composed of, in aqueous solution, an alkali metal hydroxide, a nitro-substituted aromatic compound and an aliphatic polyamine. Nickel stripping solutions which can be made more or less selective in stripping nickel in the presence of copper and containing a polyphosphate, a nitro-organic compound, ammonia and a thiosulfate are disclosed by U.S. Pat. 3,460,938. The stripping solution can be made more or less selective in stripping nickel in the presence of copper by varying the concentration of the thiosulfate.

SUMMARY OF THE INVENTION

The stripping solutions of the present invention are non-cyanide, alkaline solutions comprising:

(a) a nitro-substituted aromatic compound having at least one —$NO_2$ group attached to the aromatic ring and a water-solubilizing substituent also attached to the aromatic ring;
(b) elemental sulfur;
(c) an alkali phosphate;
(d) an alkali chloride;
(e) an aliphatic alkylene polyamine; and
(f) an inhibitor to prevent corrosive attack on the substrate.

Such solutions constitute a considerable improvement over the prior stripper solutions for stripping nickel and/or copper from metal substrates such as ferrous metal substrates and non-metallic substrates, e.g. plastic substrates as exemplified by acrylonitrile-butadiene-styrene, i.e. ABS, copolymer substrates for the reasons: (1) strips nickel and/or copper from the metal substrates and also the plastic substrates; (2) enables the use of elemental sulfur to accelerate the rate of stripping of nickel without forming a sulfide of copper on the copper or, if formed, without retention of the copper sulfide on the copper, which sulfide if formed and retained on the copper would interfere with and prevent the hazards attendant with its presence; and (4) selectively dissolves the nickel and/or copper deposits from the ferrous metal or plastic surface without substantially any detrimental effect to the ferrous metal or plastic surface.

The stripping solutions herein strip electroplated nickel, electroplated copper, electroless copper and electroless nickel deposits. With regard to stripping of electroless nickel deposits, the stripping solutions herein are especially well suited for stripping low phosphorous content electroless nickel deposits usually containing about 2%–5% phosphorous, inasmuch as the stripping rate for the low phosphorous content deposits is appreciably higher than that for stripping high phosphorous content electroless nickel deposits usually containing about 8%–12% phosphorous. However the stripping solutions will give effective stripping of the high phosphorous content electroless nickel deposits albeit at a lower stripping rate and can be employed for this purpose if the lower stripping rate is acceptable to the user.

The stripping solutions of this invention are utilizable for stripping nickel and/or copper from metal substrates such as, for instance, ferrous metal substrates. Thus the nickel or copper deposit on the ferrous metal substrate can be selectively dissolved therefrom, or both a nickel deposit and a copper deposit on the ferrous metal can be selectively dissolved therefrom, for example a nickel deposit over a copper deposit on steel in automobile hardware such as bumpers. The stripping solutions herein are also utilizable for stripping nickel and/or copper from non-metallic substrates or bases such as plastics commonly used in automobiles, e.g. ABS, for decorative moldings, window crank knobs, etc., and in electronic components.

The capability of stripping copper in the presence of sulfur provided by the combination of constituents of the stripper compositions of this invention as previously specified herein was an entirely unexpected result for the reason it was believed that an insoluble copper sulfide film would be formed and retained on the surface of the copper being stripped by reaction with the sulfur and which film would prevent stripping of the copper. Moreover, the ability to strip copper deposits with a stripping solution that has been previously used to strip bright nickel electrodeposits is also unexpected for the reason that most if not all bright nickel electrodeposits contain sulfur derived from the brightener additive added to the nickel electroplating bath, and the sulfur enters into the stripper solution during stripping of the nickel. This sulfur would also be expected to form the insoluble copper sulfide film on the copper surface which would prevent stripping of the copper as previously mentioned herein.

The alkylene polyamine constituent functions (1) as a solvent for the sulfur in the stripping solutions herein, (2) to dissolve and hence remove copper sulfide deposits or film that tend to be formed on the surface of the copper being stripped and which, if not removed, will interfere with and prevent stripping of the copper, and (3) to chelate the stripped copper and/or nickel ions.

Although we do not wish to be bound by theory, it is believed the phosphate and chloride ions supplied by the alkali phosphate and alkali chloride constituents function to activate and accelerate the rate of stripping of the copper.

The nitro-substituted aromatic compound is utilized in the stripping baths herein in amount of at least about 5 grams per liter to up to near saturation; the elemental sulfur is utilized in the stripping baths herein a small amount sufficient to accelerate the rate of stripping of the nickel but not in excess of about 10 grams per liter; the alkali phosphate and alkali chloride are utilized in the stripping baths herein each in amount of at least about 4 grams per liter to up to near saturation; the inhibitor for inhibiting corrosive attack in a minor or effective amount sufficient to inhibit corrosive attack on the ferrous metal substrate; and the aliphatic alkylene polyamine in amount of at least about 7 grams per liter to up to saturation.

The method of the present invention involves:

(a) Contacting the nickel, copper or nickel-copper alloy deposit on the substrate with the non-cyanide alkaline solution of this invention, usually by immersing the deposit on the substrate in the solution; and (b) Continuing the contacting of the nickel, copper or nickel-copper alloy deposit on the substrate with the non-cyanide alkaline solution until the deposit is selectively dissolved from the substrate surface.

The nitro-substituted aromatic compound constituent having one or more —$NO_2$ groups attached to the aromatic or benzene ring carbon or carbons and the water-solubilizing substituent also attached to the aromatic ring is exemplified by o-, m- and p-nitrobenzene sulfonic acids and mixtures thereof; o-, m- and p-nitrobenzoic acids and mixtures thereof; o-, m- and p-nitro-chlorobenzenes and mixtures thereof; and the alkali metal, e.g. sodium and potassium, salts of the acids set forth immediately above. Other suitable nitro-substituted aromatic compounds utilizable in the stripping solutions herein are those disclosed in aforementioned U.S. Pat. 2,649,361 and U.S. Pat. 2,698,781 to Meyer.

The elemental sulfur of the stripping baths of this invention is usually a finely-divided or powdered sulfur, although larger particle size sulfur such as granules, pieces or chunks of sulfur can be utilized. The sulfur accelerates materially the rate of stripping of the nickel and, as exemplary, was found to accelerate the stripping rate of nickel from 4–5 micrometers per hour to 50–60 micrometers per hour at a temperature of 158° F. of the stripping solution.

The alkylene polyamine utilizable herein can be represented by the following formula:

$$NH_2(CH_2CH_2NH)_n—H$$

wherein $n$ is an integer having a value of 1 to 4 inclusive. Such alkylene polyamines include ethylene diamine, diethylene triamine, triethylenetetramine and tetraethylenepentamine.

The alkali phosphates utilizable in the stripping baths of this invention include ammonium phosphates such as diabasic ammonium phosphate, i.e. $(NH_4)_2HPO_4$, and monobasic ammonium phosphate, i.e. $NH_4H_2PO_4$; and alkali metal phosphates, e.g. sodium phosphate and potassium phosphate.

The alkali chlorides utilizable in the stripping baths of this invention include ammonium chloride and alkali metal chlorides, e.g. sodium chloride and potassium chloride.

Any inhibitor or inhibiting agent capable of inhibiting corrosive attack of the stripping solutions of this invention on a ferrous metal substrate is utilizable in the stripping solutions. Exemplary of the corrosion attack inhibitors utilizable herein is one or more of nitro-cinnamic acid of the formula

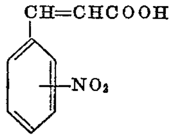

an alkali metal benzoate of the formula

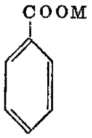

wherein M is —Na or —K, and an alkali metal nitrite of the formula $$MNO_2$$

wherein M is —Na or —K.

As aforementioned, the stripping solutions herein are alkaline solutions, i.e. have a pH above 7.

The stripping solutions herein are utilizable to strip nickel, copper, or nickel-copper alloys at room temperature of the bath and also at elevated bath temperatures up to about 170° F.

In preparing the stripper solutions or baths of this invention, when the user himself prepares the solution, it may be prepared by dissolving the elemental sulfur, e.g. flowers of sulfur, in the alkylene polyamine, e.g. diethylenetriamine, and admixing the resulting mixture with water. A powder concentrate prepared as is hereinafter disclosed and containing the alkali concentrate, e.g. the ammonium phosphate, alkali chloride, e.g. the ammonium chloride, nitro-substituted aromatic compound, e.g., sodium meta-nitrobenzene sulfonate, and the corrosive attack inhibitor, e.g. the alkali metal nitrite, is then admixed with the thus-prepared aqueous mitxure of alkylene polyamine and elemental sulfur. However, when the stripper composition is not to be used by the producer, but is to be marketed and used by the purchaser, the stripper composition is ordinarily prepared as two concentrate compositions, viz a powder solid concentrate containing the alkali phosphate, alkali chloride, nitro-substituted aromatic compound and corrosive attack inhibitor and a liquid concentrate containing the sulfur dissolved in the alkylene polyamine. The solid and liquid concentrates are mixed together with water by the customer in predetermined proportions of each concentrate and water to form the ready-to-use stripper solution or bath. Thus the powder concentrate typically contains by weight, 11.10% of the alkali phosphate, e.g. ammonium phosphate $$((NH_4)_2 \cdot HPO_4)$$

22.20% of the alkali chloride, e.g. ammonium chloride, 50.00% of the nitro-substituted aromatic compound, e.g. sodium metanitrobenzene sulfonate, and 16.70% of the corrosive attack inhibitor, e.g. sodium nitrate; the liquid concentrate typically contains, by weight, 0.07% of elemental sulfur and the remainder the alkylene polyamine, e.g. diethylene triamine, in which the elemental sulfur is dissolved; and the two concentrates and water are mixed together by the customer user to form the ready-to-use stripper solution (in the case of a 1 liter bath solution) in typical proportions of 180 grams of the powder concentrate, 160 ml. of the liquid concentrate and sufficient water to form a 1 liter bath. The powder concentrate may be prepared by thoroughly mixing the alkali phosphate, e.g. the ammonium phosphate, and alkali chloride, e.g. the ammonium chloride, until substantially free of all lumps, then mixing or blending in the nitro-substituted aromatic compound with the thus-obtained mixture, and finally adding the corrosive attack inhibitor, e.g. the alkali metal nitrite to and mixing such inhibitor with the resulting mixture.

DESCRIPTION OF THE PREFERRED EMBODIMENTS

The alkylene polyamine utilized in the stripping solutions of this invention is preferably a concentrated alkylene polyamine liquid of a concentration in the range of about an 85% alkylene polyamine solution, i.e. a solution containing about 85 weight percent of the alkylene polyamine, to anhydrous alkylene polyamine inclusive. The concentrated alkylene polyamine solution is usually an aqueous solution. With concentrations of the alkylene polyamine much below 85%, trouble may be encountered in effectively dissolving the elemental sulfur, removal of the copper sulfide film, and in chelating the stripped copper and/or nickel ions.

The preferred nitro-substituted aromatic compound is sodium meta-nitrobenzene sulfonate; the preferred alkali phosphate is an ammonium phosphate; the preferred alkali chloride is ammonium chloride; the preferred alkylene polyamine is diethylene triamine; and the preferred corrosive attack inhibitor is the alkali metal nitrite. Preferred among the ammonium phosphates is ammonium orthophosphate (mono-hydrogen), i.e. $(NH_4)_2HPO_4$.

The stripping solutions herein preferably have a pH in the range of about 7.0 to about 11.0 inclusive.

The constituents of the stripping solutions of this invention are preferably present therein in amounts within the following proportion ranges:

| | Grams per liter |
|---|---|
| Nitro-substituted aromatic compound,, e.g. sodium m-nitrobenzene sulfonate. | About 7 to about 240. |
| Elemental sulfur | About 0.001 to about 10. |
| Alkali phosphate, e.g. dibasic-ammonium phosphate. | About 4 to about 240. |
| Alkali chloride, e.g. ammonium chloride. | Do. |
| Alkylene polyamine, e.g. diethylenetriamine. | About 7 to about 240. |
| Corrosion attack inhibitor, such as alkali metal nitrite. | About 4 to about 240. |

When ortho-nitro-cinnamic acid is the corrosion inhibitor constituent instead of the alkali metal nitrite it is preferably present in an effective amount within the range of about 0.001 to about 10 grams per liter. When sodium benzoate is the corrosion inhibitor ingredient, it is preferably present therein in an effective amount within the range of about 0.001 to about 120 grams per liter.

The constituents of the stripping solutions herein are more preferably present therein in amounts within the following ranges when the corrosion attack inhibitor is an alkali metal nitrite:

| | Grams per liter |
|---|---|
| Nitro - substituted aromatic compound, e.g. sodium m-nitrobenzene sulfonate. | About 30 to about 120. |
| Elemental sulfur | About 0.05 to about 0.50. |
| Alkali chloride, e.g. ammonium chloride. | About 30 to about 75. |
| Alkali phosphate, e.g. dibasic ammonium phosphate. | About 15 to about 45. |
| Alkylene polyamine, e.g. diethylene triamine. | About 90 to about 240. |
| Alkali metal nitrite, e.g. sodium or potassium nitrite. | About 7 to about 120. |

A solution found to give especially good results herein for stripping nickel and/or copper from ferrous metal and ABS substrates is an aqueous solution of the following composition:

| | Grams per liter |
|---|---|
| Dibasic ammonium phosphate | 20.00 |
| Ammonium chloride | 40.00 |
| Sodium meta-nitro-benzene sulfonate | 90.00 |
| Sodium nitrite | 30.00 |
| Diethylenetriamine | 160.00 |
| Sulfur | 0.10 |

Although preferred stripping solutions herein satisfactorily strip copper electrodeposits from a metal such as steel at room temperature of the solution, the rate of stripping is increased by heating the stripping solution to 110° F. For stripping nickel electrodeposits from a metal such as steel, a stripping solution temperature of 140° F.–160° F. is recommended. For stripping both electrolytic copper and electroless copper from a plastic such as ABS, room temperature of the stripping solution gives a good stripping rate and is recommended. For stripping both electrolytic copper and electroless nickel deposits from a plastic such as ABS, a stripping solution temperature of 135° F.–145° F. is recommended.

The following examples further illustrate the invention:

Example 1

A plurality of steel panels each of dimensions of 3" x 4" x 0.0125" were electroplated with 53 micrometers of bright nickel. The nickel plated panels were immersed in a one liter bath of a non-cyanide, alkaline aqueous solution of the following compositions:

| | Grams per liter |
|---|---|
| Dibasic ammonium phosphate, i.e. $(NH_4)_2HPO_4$ | 20.00 |
| Ammonium chloride | 40.00 |
| Sodium meta-nitro-benzene sulfonate | 90.00 |
| Sodium nitrite | 30.00 |
| Diethylenetriamine | 160.00 |
| Sulfur | 0.10 |

The solution was maintained at a temperature of 158° F. during the immersion of the nickel-plated steel panels therein. After being immersed in the solution for 1 hour, the panels were removed from the solution and examined. The nickel electrodeposit had been removed from the steel and the steel substrate was free of etching or pitting.

Example 2

A plurality of steel panels each of dimensions of 3" x 4" x 0.0125" were electroplated with 53 micrometers of a sulfur-free Watt's type nickel. Such nickel-plated panels were immersed for 1 hour in a non-cyanide, alkaline solution of the same composition as that set forth in Example 1 herein. After an immersion time of 1 hour, the panels were removed from the solution and examined. The nickel had been removed from the steel, and the steel substrate was free of etching or pitting.

Example 3

A plurality of steel panels each of dimensions of 3" x 4" x 0.0125" were electroplated with copper. One-half of the number of panels were copper electroplated in a copper cyanide-type electroplating bath and the remaining panels were copper electroplated in a bright acid copper electroplating bath. The thickness of the copper electrodeposits were measured on each panel and found to be 38 micrometers. These copper-plated steel panels were immersed for 1 hour in a non-cyanide, alkaline solution of the same composition as that set forth in Example 1 herein, and maintained at a temperature of 49° C. The copper deposits had been removed from the panel after the 1 hour immersion, and the steel substrates were found to be free from etching or pitting.

Example 4

A plurality of steel panels each of dimensions of 3" x 4" x 0.0125" were electroplated first with 38 micrometers of bright acid copper followed by an electrodeposit of bright nickel of 50 micrometers thickness over the copper electrodeposit. These copper- and nickel-plated panels were immersed in a non-cyanide alkaline solution of the same composition as that set forth in Example 1, and maintained at a temperature of 70° C. The nickel-copper deposits were removed from the panels after two hours. The steel substrates were examined and found to be free from etching or pitting.

Example 5

A plurality of panels of "Cyclolac" acrylonitrile-butadiene-styrene, i.e. ABS, copolymer panels were electrolessly copper plated in a chemical reduction copper plating bath to a copper thickness of about 40 micro-inches, followed by being electroplated with copper in a bright acid copper electroplating bath to a thickness of 38 micrometers of the electrodeposit. The thus-plated panels were then immersed in a non-cyanide, alkaline solution of the same composition as that set forth in Example 1 herein, and maintained at 60° C. All copper was removed from the panels after 55 minutes immersion in the solution.

Example 6

A plurality of panels of "Cyclolac" ABS copolymer were electrolessly nickel plated in a room temperature type chemical reduction nickel plating bath to a nickel thickness of about 20 micro-inches, followed by being electroplated with copper in a bright acid copper electroplating bath to an electrodeposit thickness of 38 micrometers. The thus-plated panels were then immersed in a non-cyanide, alkaline solution of the same composition as that set forth in Example 1 herein and maintained at 60° C. All copper and nickel was stripped from the panels after 55 minutes immersion in the solution.

The following examples are illustrative of additional non-cyanide, alkaline stripping solutions utilizable for stripping nickel and/or copper from ferrous metal and plastic substrates.

Example 7

| | Grams per liter |
|---|---|
| Sodium phosphate | 30.00 |
| Sodium chloride | 40.00 |
| Meta-nitrobenzoic acid | 120.00 |
| Potassium nitrite | 30.00 |
| Ethylene diamine | 150.00 |
| Sulfur | 1.00 |

Example 8

| | Grams per liter |
|---|---|
| Monobasic ammonium phosphate, i.e. $NH_4H_2PO_4$ | 15.00 |
| Ammonium chloride | 30.00 |
| Sodium meta-nitro-benzene sulfonate | 90.00 |
| Ethylene diamine | 150.00 |
| Ortho-nitro-cinnamic acid | 0.01 |
| Sulfur | 0.10 |

Example 9

| | Grams per liter |
|---|---|
| Potassium phosphate | 40.00 |
| Potassium chloride | 40.00 |
| Sodium meta-nitro-benzene sulfonate | 90.00 |
| Diethylenetriamine | 160.00 |
| Sodium benzoate | 1.00 |
| Sulfur | 0.10 |

Example 10

| | Grams per liter |
|---|---|
| Dibasic ammonium phosphate, i.e. $(NH_4)_2HPO_4$ | 60.00 |
| Ammonium chloride | 40.00 |
| Sodium meta-nitro-benzene sulfonate | 90.00 |
| Sodium nitrite | 30.00 |
| Diethylenetriamine | 160.00 |
| Sulfur | 0.10 |

The elemental sulfur in foregoing Examples 1–10 was flowers of sulfur.

What is claimed is:

1. An alkaline solution for selectively stripping at least one material selected from the group consisting of nickel and copper from a ferrous metal or plastic substrate comprising:

(a) about 5 grams per liter to up to near saturation of a nitro-substituted aromatic compound having at least one —$No_2$ group attached to the aromatic ring and a water-solubilizing substituent also attached to the aromatic ring;

(b) a small amount sufficient to accelerate the rate of stripping of the nickel but not in excess of about 10 grams per liter of elemental sulfur;

(c) about 4 grams per liter to up to near saturation of an alkali phosphate;

(d) about 4 grams per liter to up to near saturation of an alkali chloride;

(e) about 7 grams per liter to up to near saturation of an aliphatic alkylene polyamine; and (f) an effective amount sufficient to inhibit corrosive attack on a ferrous metal substrate of a corrosion attack inhibitor.

2. The solution of claim 1 wherein the nitro-substituted aromatic compound is sodium meta-nitro benzene sulfonate.

3. The solution of claim 1 wherein the constituents are present therein in amounts within the following proportion ranges:

| | Grams per liter |
|---|---|
| Nitro-substituted aromatic compound | About 7 to about 240. |
| Elemental sulfur | About 0.001 to about 10. |
| Alkali phosphate | About 4 to about 240. |
| Alkali chloride | Do. |
| Alkylene polyamine | About 7 to about 240. |
| Corrosion attack inhibitor such as alkali metal nitrite | About 4 to about 240. |

4. The solution of claim 3 wherein the alkylene polyamine is a concentrated alkylene polyamine liquid of an alkylene polyamine concentration in the range of about 85% to anhydrous alkylene polyamine inclusive.

5. The solution of claim 4 wherein the alkali phosphate is an ammonium phosphate, the alkali chloride is ammonium chloride, the alkylene polyamine is at least one material selected from the group consisting of diethylene triamine and ethylene diamine, the alkali metal nitrite is sodium nitrite, the nitro-substituted aromatic compound is sodium metal-nitro benzene sulfonate, and the solution has a pH in the range of about 7.0 to about 11.0 inclusive.

6. Solution of claim 4 wherein the concentrated alkylene polyamine liquid is a concentrated alkylene polyamine aqueous solution.

7. The solution of claim 1 having a pH in the range of about 7.0 to about 11.0 inclusive.

8. A method for stripping at least one material selected from the group consisting of a nickel and copper deposit from a ferrous metal or plastic substrate which comprises:

(a) contacting the deposit on the ferrous metal or plastic substrate with an alkaline solution comprising:

(1) about 5 grams per liter to up to near saturation of a nitro-substituted aromatic compound having at least one —$NO_2$ group attached to the aromatic ring and a water-solubilizing substituent also attached to the aromatic ring;

(2) a small amount sufficient to accelerate the rate of stripping of the nickel but not in excess of about 10 grams per liter of elemental sulfur;

(3) about 4 grams per liter to up to near saturation of an alkali phosphate;

(4) about 4 grams per liter to up to near saturation of an alkali chloride;

(5) about 7 grams per liter to up to near saturation of an aliphatic alkylene polyamine; and (6) an effective amount sufficient to inhibit corrosive attack on a ferrous metal substrate of a corrosion attack inhibitor; and (b) continuing the contacting of the deposit on the substrate with the alkaline solution until the deposit is selectively dissolved from the substrate surface.

9. The method of claim 8 wherein the contacting of the nickel and/or copper on the substrate with the alkaline solution is by immersion.

10. The method of claim 9 wherein the alkaline solution is at a temperature in the range of room temperature to about 170° C. during the immersion contacting.

11. The method of claim 9 wherein the alkali phosphate is an ammonium phosphate, the alkali chloride is ammonium chloride, the alkylene polyamine is at least one material selected from the group consisting of diethylene triamine and ethylene diamine, and the substrate is a plastic substrate.

12. The method of claim 11 wherein the plastic is an ABS copolymer.

References Cited

UNITED STATES PATENTS

| | | | |
|---|---|---|---|
| 2,366,796 | 1/1945 | Lawrence et al. | 23—1 A |
| 3,245,780 | 4/1966 | Weisberg et al. | 75—103 |
| 3,460,938 | 8/1969 | Grunwald et al. | 75—97 R |

JACOB H. STEINBERG, Primary Examiner

U.S. Cl. X.R.

75—97, 117, 119; 252—79.4, 79.5